United States Patent [19]

Shaw

[11] E Re. 29,283

[45] Reissued June 28, 1977

[54] UNDERCOMPRESSION AND OVERCOMPRESSION FREE HELICAL SCREW ROTARY COMPRESSOR

[75] Inventor: David N. Shaw, Unionville, Conn.

[73] Assignee: Dunham-Bush, Inc., West Hartford, Conn.

[22] Filed: June 2, 1976

[21] Appl. No.: 692,077

Related U.S. Patent Documents

Reissue of:

[64] Patent No.: 3,936,239
Issued: Feb. 3, 1976
Appl. No.: 492,084
Filed: July 26, 1974

[52] U.S. Cl. ..... 417/282; 417/310; 417/291; 417/315; 418/201; 418/202

[51] Int. Cl.² ..... F04B 49/02

[58] Field of Search ..... 417/282, 291, 310, 315; 418/159, 201, 202, 203

[56] References Cited

UNITED STATES PATENTS

| | | | |
|---|---|---|---|
| 2,444,952 | 7/1948 | Paget | 417/282 |
| 3,088,659 | 5/1963 | Nilsson et al. | 418/201 |
| 3,656,876 | 4/1972 | Kocher | 418/201 |
| 3,738,780 | 6/1973 | Edstrom | 417/310 |
| 3,756,753 | 9/1973 | Persson et al. | 418/201 |
| 3,759,636 | 9/1973 | Schaefer et al. | 417/310 |

*Primary Examiner*—Carlton R. Croyle
*Assistant Examiner*—Gregory P. LaPointe
*Attorney, Agent, or Firm*—Sughrue, Rothwell, Mion, Zinn & Macpeak

[57] ABSTRACT

An axially shiftable slide valve member in a rotary, helical screw compressor carries a port which senses the pressure of the working fluid in the trapped volume just before uncovering of the closed thread to the discharge port and compares that pressure with the line pressure at the discharge port and shifts the slide valve member to balance the pressures and prevent overcompression or undercompression of the compressor. The screw compressor may be provided with two identical but oppositely oriented slide valve members on opposite sides of the intermeshed helical screws with one slide valve member controlling the capacity of the compressor and the other balancing the closed thread pressure at discharge with discharge line pressure. Compressor rotation may be reversed to eliminate the need for a reversing valve where the compressor operates in heat pump or reverse flow defrost refrigeration applications, with the two slide valves trading functions.

16 Claims, 5 Drawing Figures

UNDERCOMPRESSION AND OVERCOMPRESSION FREE HELICAL SCREW ROTARY COMPRESSOR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to rotary helical screw compressors and more particularly to the use of slide valves for controlling compressor capacity and the discharge pressure of the machine.

2. Description of the Prior Art

Rotary helical screw compressors constitute positive displacement machines, wherein a working fluid is trapped within the closed threads of helical screw rotors whose grooves and lands are intermeshed: the screw rotors being mounted for rotation within intersecting bores with coplanar axes defining the barrel portion of a screw compressor casing. In order to control the capacity of the compressor and to control the pressure ratio or the pressure of the working fluid at compressor discharge, slide valves have been provided to the compressor which are carried within axially extending recesses within the barrel portions of the casing in open communication with the bores and to respective sides of the intermeshed screws. U.S. Pat. No. 3,088,659 to H. R. Nilsson et al and entitled "Means for Regulating Helical Rotary Piston Engine" is exemplary of the employment of such slide valves within rotary helical screw compressors.

In an effort to improve lubrication and cooling of the parts of the helical screw compressor forming the compressor working chamber, attempts have been made to inject liquid refrigerant, water, oil, and relatively low temperature gas into a closed thread of the compressor by means of a port, carried by the slide valve and opening up into the compressor working chamber upstream of the discharge port of the screw compressor and movable with the slide valve to shift the injection port automatically with the shift of the slide valve, which controls the machine capacity by bypassing a portion of the compressed working fluid near the suction side of the machine, back to the suction port. Such liquid refrigerant injection is the subject matter of U.S. Pat. No. 3,795,117 to Moody et al entitled "Injection Cooling of Screw Compressors".

SUMMARY OF THE INVENTION

The present invention is directed to a positive displacement screw compressor of the type wherein a casing is provided with a barrel portion defined by intersecting bores with coplanar axes located between axially spaced end walls and having low pressure and high pressure ports communicating with said bores at opposite ends and helical screw rotors each having grooves and lands mounted for rotation within respective bores with the lands and grooves of respective rotors intermeshed. An axially extending recess is provided within the barrel portion of the casing in open communication with the bores and a slide valve is axially slidable in the recess with the inner face of the slide valve being complementary to the envelope of that portion of the bores of the casing structure confronted by the opening of the recess, communicating with the bore portion of the casing structure with the valve member in sealing relation with confronting rotor structure. Further, the discharge port has at least a portion located in the barrel portion of the casing structure with the valve member being movable between extreme positions, in which, the discharge port is opened and closed. The valve member is of sufficient length to cover the entire remaining length of the confronting portion of the rotor structure throughout the range of movement of the valve member between its extreme positions. The invention resides in means for sensing the pressure of the working fluid within a closed thread closely adjacent to the end of the slide valve closing off the discharge port to the closed thread and means for sensing the pressure of the working fluid at the discharge port and for comparing these pressures. Further, the invention comprises motor means for autmatically shifting the slide valve axially to equalize the pressures to prevent undercompression or overcompression of the compressor working fluid within the closed thread by the compressor, prior to discharge.

Preferably, the slide valve carries a sensing port opening up to the closed thread and conduit means within the slide valve communicates the closed thread pressure sensing port to means external of the compressor casing for comparison of the compressor discharge pressure with the gas pressure at the compressor discharge port. The slide valve member is preferably shifted axially by a power piston slidable within a cylinder and connected to the slide valve member by a piston rod. A pilot valve responsive to the pressure differential controls the flow of a motive fluid to and from the respective sides of the power piston to shift the slide valve member to balance the two gas pressures. Preferably, a pilot valve which controls the application of motive fluid to and from the power piston comprises a valve spool having lands at opposite ends subjected directly to the closed thread pressure and the discharge port pressure for controlling the position of the pilot valve spool, and thus the power piston and slide valve member.

In another embodiment of the invention, a pair of slide valves are provided to the screw compressor on opposite sides of the intermeshed screws, the slide valves being identical in this embodiment of the invention. The slide valves are located on opposite sides of the barrel portion of the casing structure and are movable between extreme positions in which a respective port is fully open and the other of which the port is essentially closed with the length of each valve member being sufficient to cover the entire remaining length of the confronting portion of the rotor structure and the slide valves are oriented oppositely. The screw compressor may be driven in either direction, with the ports acting either as suction ports or exhaust ports for the compressor, dependent upon the direction of rotation of the screw compressor. The slide valves in turn, either control compressor capacity or match compressor discharge line pressure with that of the closed thread by shifting of the slide valves. By reversing the direction of rotation of the compressor, the necessity of a reversing valve is eliminated when using the bidirectional compressor in heat pump or refrigeration defrost applications.

DESCRIPTION OF THE PREFERRED EMBODIMENTS

Figure 1:
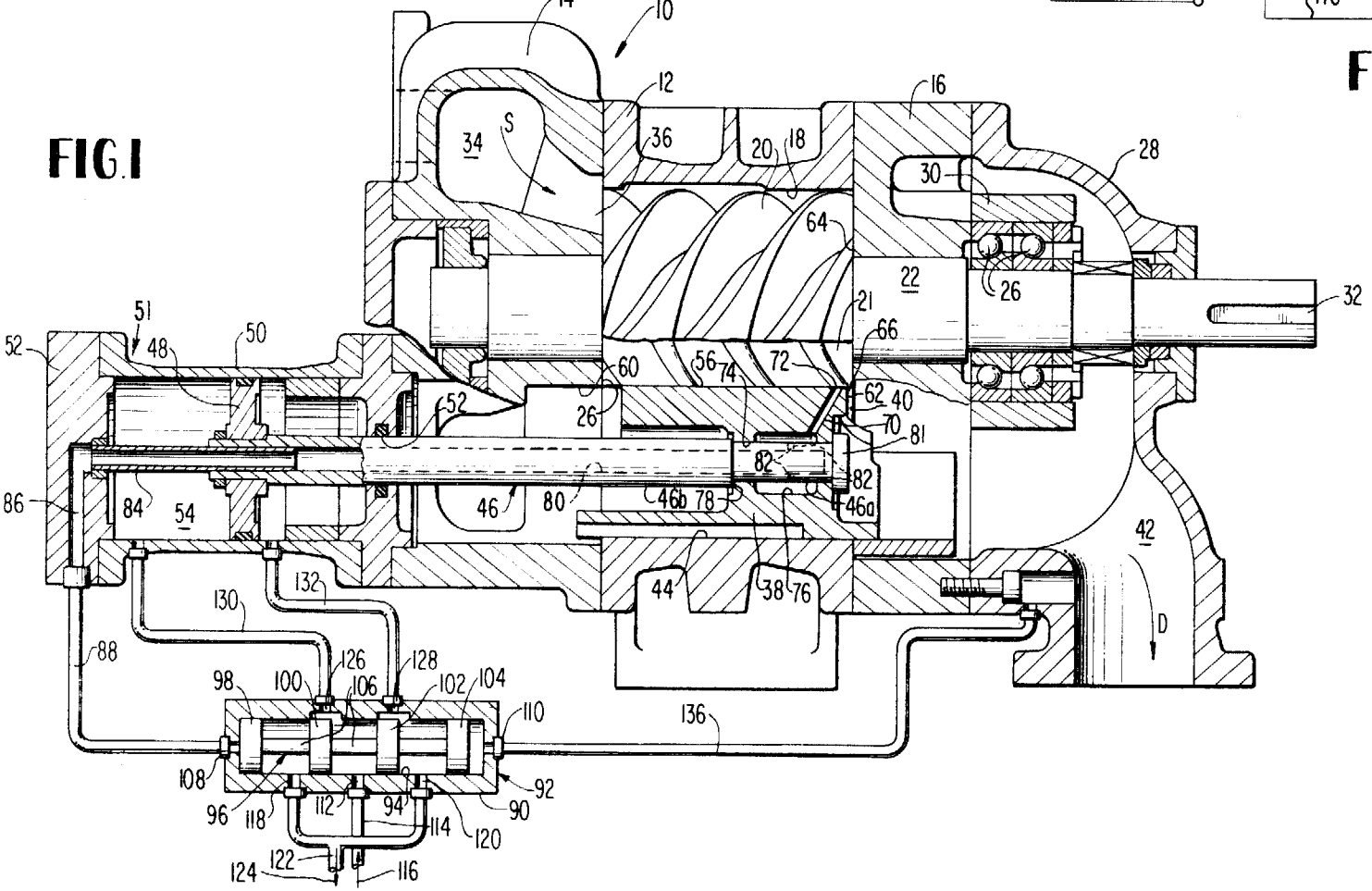
FIG. 1 is a sectional view of a rotary helical screw compressor employing the slide valve member of the present invention to match closed thread pressure at the discharge side of the machine to the discharge line pressure at the discharge port.

Reference to FIG. 1 shows one embodiment of the present invention as applied to a rotary helical screw compressor. The rotary helical screw compressor 10 comprises a casing structure having a central barrel portion 12 located between end wall sections or portions 14 and 16 and providing a working space formed by two intersecting bores (of which bore 18 is illustrated) and which carries a helical screw rotor 20 in mesh with a second helical screw rotor 21 which has an axis coplanar thereto and extending through the barrel portion 12 of the casing structure. The helical screw compressor in this respect is conventional, and both the male and female rotors have helical lands and intervening grooves and are mounted to rotate in the bores by means of bearings. For instance, screw rotor 20 is mounted for rotation on shaft 22 by being supported within bearing [20] *21* of end wall portion 14, while the shaft 22 is supported by way of anti-friction bearings 26 carried by end wall portion 16 and mounted within an end bell 28 by way of sleeve 30; shaft 22 extending through the end bell 28 and being splined at 32 to permit the screw compressor to be coupled to an electric motor or the like (not shown) as the motive force for driving the screw compressor.

In the embodiment of FIG. 1, the screw compressor is rotated in a single direction only such that gas or other working fluid passes through the suction or intake passage 34 within end wall portion 14 and enters by way of suction or inlet port 36 into the working space formed by the intermeshed helical lands and grooves of respective rotors. There is no capacity control shown in the embodiment of FIG. 1 and the essence of this invention lies in the employment of a slide valve member shown generally at 38 to perform a specific function, that is, to match the closed thread pressure at the discharge side of the machine, that is, adjacent end wall portion 16, with the line pressure of the gas at the high pressure discharge port 40 at the end of slide valve member 38. It is a characteristic of these rotors that the flanks of the lands of the male rotors are convexly curved and with their intervening grooves lying substantially outside the pitch circle of the male rotor while the lands of the female rotor are concavely curved with their intervening grooves lying substantially inside the pitch circle of the female rotor. It is further characteristic of such rotors that the effective wrap angle of the lands is less than 360°. The casing structure, therefore, is provided with the high pressure discharge port 40, the major portion of which lies on one side of a plane passing through the axes of the rotors with the discharge port 40 being located within the high pressure end wall portion 16 of the machine. The discharge port 40 is in fluid communication with discharge passage 42 formed within end bell 28. As mentioned previously, the low pressure end wall portion 14 of the casing structure is provided with an intake or suction passage 34 which communicates by way of suction port 36 with that side of the barrel portion defined by the bores, including bore 18, to the opposite side of the plane passing through the rotor axes relative to high pressure discharge port 40.

The barrel portion 12 of the casing structure is further provided with a centrally located, axially extending, cylindrical recess 44 which is in open communication, at one end, with the high pressure port 40 and at the other end extends axially beyond the low pressure end wall 26. The recess 44 therefore is open to the working space provided by the bores. It is this recess 44 which carries the longitudinally slidable, slide valve member 38. The axial position of slide valve member 38 within the recesses is adjusted by way of piston rod 46 which mechanically couples the slide valve 38 to the power piston 48 of a fluid motor 51 at the opposite end of rod 46. Power piston 48 is sealably and slidably supported within a power piston cylinder 50 which is mechanically coupled to the low pressure end wall portion 14 of the casing structure and is sealed therefrom by way of piston rod 46 which slidably extends through an opening 52 within end wall casing structure portion 14. An end cap [52] *53* is mechanically coupled to the end of cylinder 50 so as to form a sealed chamber 54 within the cylinder which slidably receives piston 48. The inner surface 56 of valve member 38 confronting the rotors is shaped to provide a replacement for the cut-away portions of the bores. A portion of the slide valve member 38 slidably and sealably engages a recessed portion 60 of end wall portion 14 of the casing such that regardless of the position of the slide valve, the valve member is of a sufficient length to cover the entire remaining length of the confronting portion of the rotor structure throughout its range of movement between the extreme positions as determined by recessed portion 60 and the abutting contact or end face 62 of the slide valve with the high pressure end wall portion 16 of the casing structure.

During compression, an elastic fluid which may be a gaseous refrigerant such as freon, is drawn into and fills the grooves of the rotors through the low pressure port 36. As the rotors revolve, mating pairs of lands of the male and female rotors intermeshed at the bottom or high pressure side of the compressor form chevron shaped working chambers. As the rotors continue to revolve, these working chambers, which constitute compression chambers or closed threads, diminish in volume as the point of intermesh between any two lands determining the apex end of the given compression chamber or thread, moves axially toward the high pressure end wall 64 to diminish the volume of the compression chamber until the chamber runs out to zero bottom as the point of intermesh reaches the plane of the high pressure end wall 64. Closure of the compression chamber is effected by interface 56 of the slide valve 38 which is in confronting and sealing relation with the crests of the lands defining the boundaries of the compression chambers or closed threads. Discharge of compressed fluid is effected when the crests of the rotor lands defining the leading edge of the compression chambers pass the control edge 66 of the slide valve member 38 and which is essentially the right hand edge of valve member 38 to establish communication between the closed thread or chamber and the high pressure discharge port 40. Movement of the slide valve 38 to the left shortens the time of compression while movement to the right increases the time of compression and increases the pressure ratio between suction and discharge of the compressor. Thus, the function, assuming that the initial volume of the closed thread prior to that thread reaching edge 66 of the slide valve constant, permits the slide valve to vary the compression ratio of the compressor. This in effect controls the pressure of the discharge gas from the closed thread to the discharge port 40.

If the pressure within the discharge port 40 is less than that of the closed thread as it reaches edge 66, overcompression occurs, and immediately the pressure of that volume of gas evidenced by the closed thread is decreased to match the pressure in the compressor discharge port or the high side of the machine and thus the overcompression effort is wasted. This can amount to a substantial loss. Likewise, if the pressure of the working fluid is compressed within the closed thread prior to meeting edge 66 of the slide valve member is lower than that of the working fluid within the discharge port 40, this gas will be compressed to a pressure of the port when fluid communication is achieved between the discharge port and the closed thread. Substantial power loss may be experienced as result of either undercompression or overcompression, these losses being visually illustrated in FIGS. 3 and 4.

The present invention is directed to an arrangement for automatically shifting the slide valve member 38 to match the closed thread or working chamber fluid pressure at its point of discharge as determined by edge 66 of the slide valve [32] *38*, to the line pressure of the working fluid at the compressor discharge port 40. In this respect, the slide valve is provided with an inclined passage 70 forming at the inner surface 56 of the slide valve, a closed thread sensing port 72 which opens up to the closed thread and permits sampling of the pressure of the compressed working fluid at that point in the compression cycle and just prior to discharge. The slide valve is further bored at 74 and is provided with an annular recess 76 forming aligned openings through which extends a small diameter portion 46a of the piston rod 46. The large diameter portion 46b of this piston rod forms a shoulder 78 which acts in conjunction with the headed end 81 of the shaft to lock the piston rod or shaft 46 to the slide valve 38. The piston rod 46 is centrally bored at 80 extending almost the full length of the rod but being closed off at the enlarged headed end 81. A plurality of radial holes 82 are bored within the piston rod 46 fluid communicating the bore 80 of the piston rod with the cavity within the slide valve 38 defined by the recesses 76 and which opens up to the sensing port 72 via passage 70. Piston rod 46 carries at its opposite end in telescoping fashion a fixed tube 84 which is slidably supported by bore 80 and which is fixed and fluid sealed to end cap 52. A fluid passage 86 within the end cap is fluid coupled by way of line 88 to pilot valve casing 90 of pilot valve 92. The pilot valve 92 carries a longitudinal bore 94 within which slides a pilot valve spool 96 comprising four lands 98, 100, 102, and 104 which are slightly less in diameter than bore 94 within the valve casing. The lands are joined by reduced diameter portions 106. In addition to axial ports 108 and 110, an inlet port 112 fluid connects a line 114 leading from a supply indicated by arrow 116, while ports 118 and 120 are fluid connected to a common discharge line 122 discharging fluid from a pilot valve as indicated at 124. On the opposite side of the valve casing 90, there are provided fluid ports 126 and 128 which lead by way of lines 130 and 132, respectively, to chamber 54 carrying the power piston 48; to respective sides of the power piston 48. The cavity or chamber 54 is fluid sealed from the bore 80 of the piston rod 46. The pilot valve and the power piston comprise a fluid servo circuit of conventional design. A motive fluid as indicated by arrow 116 is selectively applied to either the left or right hand side of power piston 48, while motive fluid on the opposite side is drained by way of the pilot valve 92 to the discharge line 122 and fed back to the sump (not shown) as indicated by arrow 124 from port 118 or port 120, as the case may be.

Of importance to the present invention is the fact that the line 88 fluid couples the closed thread sensing port 72 to the left hand face of land 98 of the valve spool 96 of the pilot valve. The opposite axial port 110 is fluid connected by way of line 136 to the discharge passage 42 of the compressor such that that discharge gas line pressure is applied to the valve spool 96 and in particular to the outboard end face of land 104. The end face surface area of the lands 98 and 104 are identical so that the valve shifts to the right or the left depending upon whether the pressure within the discharge passage 42 of the compressor is higher than the pressure within the closed thread as sensed by port 72 at any instant or vice versa. With the pilot valve spool 96 in the position shown, the working fluid 116 passes to the left hand side of the power piston 48 and tends to move the piston from left to right causing the compressor to discharge gas pressure into the discharge port at a higher pressure level. This, of course, tends to increase the pressure sensed by port 72 which is transmitted by way of passage 70, recess 76, radial passages 82, bore 80 of the piston rod, passage 86 within end cap 52, and passage 88 and port 108 to the left hand end face of land 98 of the pilot valve spool 96. When that pressure exceeds the pressure exerted on the same valve spool on the opposite side thereof through land 104, as defined by the discharge passsage 42, the pilot valve will shift from left to right, thereby causing the application of motive fluid pressure as identified by arrow 116 to the right hand end face of the power piston 48 tending to shift the slide valve member from right to left and causing the pressure of the closed thread at discharge to port 40 to be reduced, by opening that closed thread to the line pressure at port 40 earlier in the compression cycle.

Figure 2:
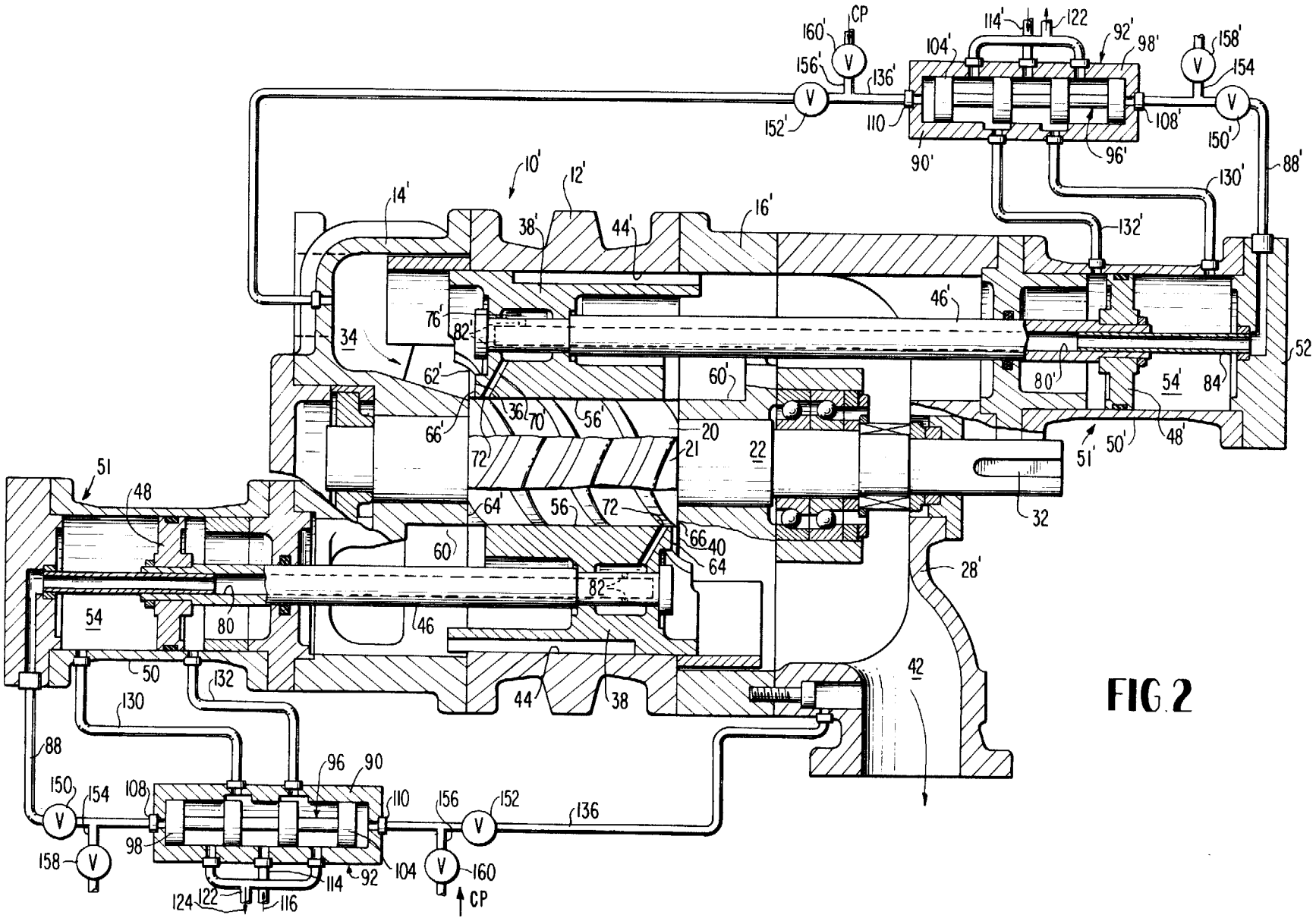
FIG. 2 is a sectional view of a reversible, rotary helical screw compressor for heat pump use, employing multiple slide valves as a second embodiment of the present invention.

FIG. 2 illustrates a second embodiment of the invention, wherein the rotary helical screw compressor is adapted to operate in either direction, and in which case the suction or low pressure side of the machine becomes the high pressure or discharge side of the machine and vice versa. In respect to this embodiment, and in comparison with the embodiment of FIG. 1, like elements are given like numerical designations. Further, this embodiment is characterized by the employment of a second slide valve member 38' which is slidably carried by the casing structure to the side of the intermeshed screws opposite that of slide valve member 38, and is positively driven between extreme positions by a servo controlled power piston which is essentially the duplicate of the pilot valve and power piston employed in conjunction with slide valve member 38. Slide valve members 38 and 38' are oppositely oriented and are associated respectively with the discharge and suction sides of the machine, however, the order is reversed when compressor rotation is reversed. In this respect, referring to FIG. 2, the rotary helical crew compressor 10' of the second embodiment comprises a casing structure having a central barrel portion 12' located between end wall sections or portions 14' and 16' and providing a working space formed by two intersecting bores in conventional fashion. The bores carry helical screw rotors 20 and 21 having helical lands and intervening grooves in mesh with each other, and having axes coplanar and extending through the barrel portion 12' of the casing structure. Helical screw rotor 20 is mounted on shaft 22 in much the same fashion as the prior embodiment. Many of the details described earlier in conjunction with the embodiment of FIG. 1 are purposely eliminated here to shorten the description, and reference may be had to the description of the embodiment of FIG. 1 if necessary. To illustrate similarity in operation of this embodiment to the prior described embodiment, the working fluid such as a refrigerant gas enters the suction passage 34 and passes by way of suction port 36 to the suction side of the machine, that is, the working chamber as defined by the two intersecting bores housing rotors 20 and 21 and the intermeshed rotors. In this embodiment, however, the control of machine capacity is achieved by way of slide valve member 38' which is located on the opposite side of the plane formed by the axes of the intermeshed screws 20 and 21, from slide valve member 38, both being carried by the central barrel portion 12'. Shaft 22 extends through end bell 28', supported by way of bearings in the manner of the prior embodiment and is provided with a spline 32 which in this case is mechanically connected to a reversible electric drive motor which is schematically illustrated at M in FIG. 5. Contrary to the embodiment of FIG. 1, the screw compressor may be rotated in a reverse direction so as to make the discharge passage 42, the suction passage, and the suction passage 34, the discharge passage. In this arrangement, the casing structure is provided with a port 40 acting in this case as the high pressure discharge port which lies to one side of a plane passing through the axes of the rotor with the port 40 being located adjacent the end wall portion 16 of the machine. Port 40 is in fluid communication with discharge passage 42.

Unlike the prior embodiment, the barrel portion 12' of the casing structure is provided with opposed, centrally located, axially extending cylindrical recesses 44 and 44' which are respectively open to the working space provided by screw rotor bores, the recesses 44 and 44' facing each other. Recess 44 in this case carries the longitudinally slidable slide valve member 38, while recess 44' carries an oppositely oriented, longitudinally slidable slide valve member 38'. In similar fashion to the prior embodiment, the axial position of slide valve member 38 within its recess is adjusted by way of piston rod 46 which mechanically couples slide valve member 38 to the power piston 48 of fluid motor 51 at the opposite end of the rod. Power piston 48 being sealably and slidably carried within power piston cylinder 50, permits the slide valve 38 to shift axially between extreme positions defined by the end wall 64 of casing structure portions 16' and recesses 60 within casing portion 14'. This is accomplished by means of a pilot valve indicated generally at 92 which controls the supply and discharge of pressurized motive fluid emanating from a source indicated by arrow 116 through the pilot valve and to power the cylinder chamber 54 to a given side of the power piston 48 and return therefrom from the opposite side by way of discharge line 124 which leads to the sump as indicated schematically by arrow 122. The pilot valve 92 is communicated to the power cylinder 50 by way of lines 130 and 132. Insofar as the pilot valve 92 is concerned, the valve spool 96 is identical and operates essentially the same as the embodiment of FIG. 1. In similar fashion to the prior embodiment, the inner surface 56 of the slide valve member 38 confronting the rotors is shaped to provide a replacement for the cut-away portions of the casing structure screw rotor bore such that a portion of the slide valve member 38 continuously, slidably and sealably engages a recessed portion of the end wall portion 14' of the casing such that regardness of the position of the slide valve member 38, the valve member is of a sufficient length to cover the entire remaining length of the confronting portion of the rotor structure throughout its range of movement between the extreme positions as determined by a recessed portion 60 and face 64 of the casing structure end wall portion 16'.

In like fashion, with respect to slide valve member 38', its inner surface 56' confronting the rotors is shaped to provide a replacement for the cut-away portion of the bores and a portion of the slide valve member 38' slidably and sealably engages a recessed portion 60' of end wall portion 16' of the casing with the valve member being of sufficient length to cover the remaining length of the confronting portion of the rotor structure throughout its range of movement between extreme positions as determind by recessed portion 60' and the end face 64' of end wall portion 16' of the casing. With the exception that the slide valve member 38' is oriented oppositely to that of slide valve member 38, both slide valve members are similar, and operated similarly except that each performs a different function during machine operation which function changes automatically in response to change in direction of screw compressor rotation. In this respect, the slide valve member 38' is connected by way of piston rod 46' to the power piston 48' of a fluid motor 51 which is slidably carried within cylinder 50'. A fixed tube 84' carried by end cap 52' is telescoped within the rod 46'; rod 46' carrying internally, a passage 80' which by way of the tube 84' fluid connects line 88' to the slide valve member pressure sensing port 72'. This is completed by way of inclined passage 70' and recess 76' within slide valve member 38' and the radial holes 82' within rod 46'. The slide valve member 38' being fixed to the piston rod which in turn fixedly carries the piston 48', causes the slide valve member 38' to move with the piston whose position changes within chamber 54' depending upon which piston side of that chamber receives a motive fluid under pressure through lines 130' and 132' leading from the pilot valve 92'. Pilot valve 92' is essentially the duplicate of valve 92 and the servo system for slide valve member 38' is identical to that for slide valve 38. A motive fluid under pressure enters the pilot valve 92' via line 114' for distribution by way of the valve spool 96' in a selective manner to changer 54' on a given side of piston 48'. Fluid is returned to the sump through line 122' from that side of the piston opposite to that receiving the motive fluid. Line 88' transmits the gas pressure within the closed thread at port 72' of the screw compressor to the pilot valve which acts against the outboard end face of pilot valve land 98'. On the opposite side of the pilot valve, the end face of land 104' is subject to the fluid pressure within line 136' which opens up to the passage 34 within end wall portion 14' of the compressor casing.

Unlike the prior described embodiment, the lines 88 and 136 leading to ports 108 and 110, respectively, of pilot valve 92 and lines 88' and 136' leading to ports 108' and 110' of the pilot valve 92' carry shut-off valves to control slide valve member operation in a selective manner depending upon whether the compressor is being driven in one direction or the other. In this regard, line 88 carries a valve 150, line 136 carries a valve 152, line 136' carries a valve 152' and line 88' carries a valve 150'. These valves may be automatically operated or manually operated and function to close off or open these lines.

Further, within the line 88 and between the cut-off valve 150 and port 108 of the pilot valve, there is a line 54 fluid connected thereto, which line carries a further cut-off valve 158. On the opposite side of the pilot valve, line 156 makes a T connection with line 136 intermediate of the cut-off valve 152 and port 110, this line carrying a cut-off valve 160. In identical fashion line 88' is provided intermediate of cut-off valve 150' and port 108', with a T connection line 154' which carries a cut-off valve 158', and line 136' between port 110' and a cut-off valve 152' is fluid connected to line 156', which line 156' carries a cut-off valve 160'.

Lines 154, 154', 156 and 156' may have selectively applied thereto fluid pressure signals permitting the pilot valve spools, for respective pilot valves to be shifted either to the left or right to positively drive the slide valve members in a manner determined by desired system operation. This permits one of the two slide valve members 38 or 38' to perform the function of capacity control, while the other seeks to balance automatically the closed thread pressure within the compressor working chamber to the compressor discharge line pressure at the discharge port.

For instance, in the illustrated embodiment of FIG. 2, assuming that passage 34 is the suction passage and passage 42 is the discharge passage of the compressor, as indicated by the arrows therein, slide valve member 38 functions to balance the closed thread pressure to the discharge line at the discharge port 40, while slide valve member 38' provides capacity control. In this case, for the servo system controlling slide valve member 38, cut-off valves 158 and 160 within lines 154 and 156 are closed and valves 150 and 152 within lines 88 and 136 are open. Within the servo system for slide valve member 38', the cut-off valve 152' within line 136' is closed as is the shut-off valve 150' in line 88. Further, valve 160' within line 156' and valve 158' within line 154' are open. The effect of this is to permit the pilot valve spool 96 to compare in terms of lands 98 and 104, the pressure within the closed throat at port 72 with the line pressure at the discharge side of the machine, that is, the pressure within discharge passage 42. The slide valve member 38 therefore shifts automatically to the right or left to balance these two pressures. Under this set-up, valve member 38 performs the identical function in this embodiment in this case as it does in the embodiment of FIG. 1.

With valves 152' and 150' closed insofar as the pilot valve 92' is concerned, the slide valve member 38' is shifted to the left or right to perform the function of capacity control. As indicated by the arrow CP upstream of valve 160' within line 156', the application of a controlled pressure signal which the arrow schematically identifies, when applied to the end face of land 104' of the valve spool 96', causes the pilot valve spool 96' to shift from left to right as shown and permitting the application of motive fluid through line 130' to the chamber 54' and which operates against the right hand end face of the power piston 48'. This would tend to shift the slide valve member 38' from right to left and in this case would decrease the area of port 36 to the intermeshed screws by shifting edge 66' of the slide valve member 38' to the left. The screw compressor design is such that the machine has minimum capacity when the slide valve 38' is positioned where its end face 62' abuts the end face 64' of casing end wall portion 14'. As the slide valve member 38 shifts therefore from left to right, the capacity of the machine increases, since more and more of the working space defined by the intermeshed screws and the bores carrying the same is exposed to the suction part. The incoming gas from suction passage 34 is subjected to isentropic expansion and recompression without any work being expended by the machine, until the pressure of the trapped volume within the closed thread reaches inlet pressure during reduction of that trapped volume. Since the intermeshed screws are open to the suction side of the machine by way of edge 65' of the slide valve member 38', a given volume of suction gas becomes sealed within a closed thread and that volume expands as the closed thread volume momentarily increases prior to recompression and its is during this time of the cycle that isentropic expansion and recompression occurs. However, this is achieved without absorbing any power from the compressor until inlet pressure is reached during subsequent reduction of the trapped volume.

Figure 3:
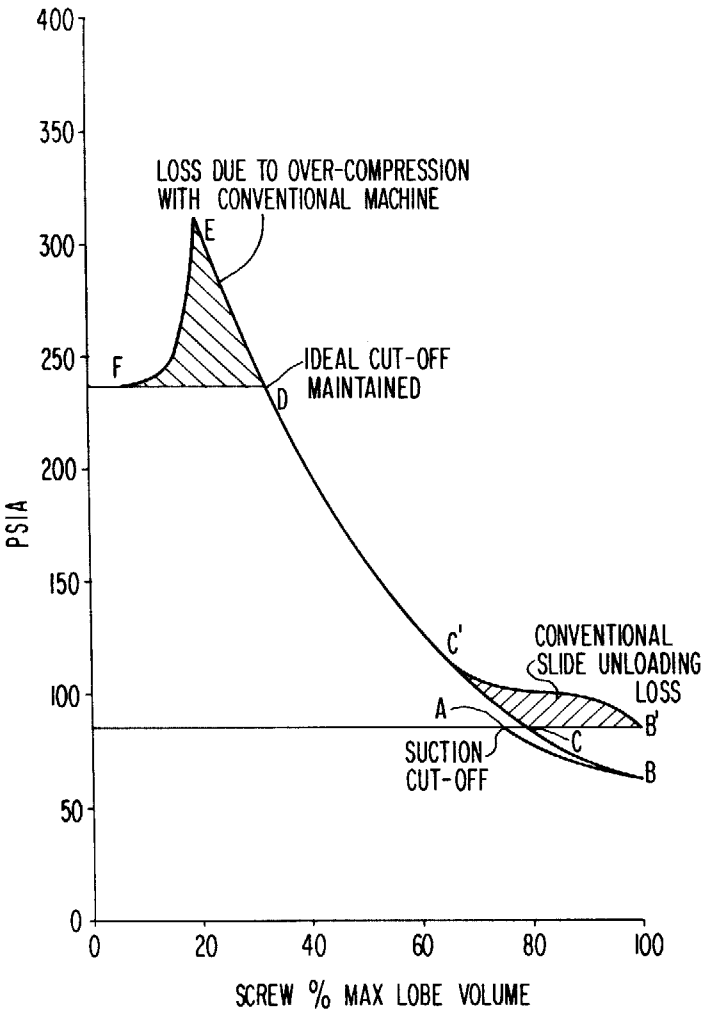
FIG. 3 is a pressure plot of the compression cycle of the rotary helical screw compressor of FIG. 2 for a heat pump system during a cooling cycle in comparison with a screw compressor employing a single, conventional slide valve for capacity control.

Reference to FIG. 3 shows a pressure, volume plot during a typical cooling cycle of the compressor of FIG. 2, wherein the isentropic expansion and recompression of ideal unloading is provided by the slide valve member 38' of the present invention. Expansion may occur from A to B and recompression from B to C without work in the machine supplied with the dual slide valve 38' of the present invention in comparison with a conventional slide valve indicated by that portion of the curve from points A to B' and thence to C'. The prior art case involves the slide valve member permitting initial compression of the trapped volume of which a portion is then returned back to the suction side of the machine and in which the partial compression of the trapped volume is lost effort.

Should it be necessary to decrease the capacity of the machine, a control signal is applied to line 154' with cut-off valves 160', 152', 150' closed. Valve 158' is open to permit a control signal to be applied to the end face of land 98', shifting the spool valve 96' to the left and permitting high pressure fluid to be applied to the left hand side of the power piston 48', shifting the unload slide valve member 38' which is acting as a capacity control or unload mechanism from left to right to load the machine.

While slide valve member 38' is acting to control the capacity of the machine, depending upon demand, the slide valve member 38 is shifting to automatically match the close thread pressure as sensed but port 72 with the compressor discharge line passage 42 and just downstream of discharge port 40. In this case, valves 150 and 152 are open and valves 158 and 160 are closed. The effect of this operation may be further seen by reference to FIG. 3, wherein assuming that the gas within the closed thread is compressed to a degree greater than that of the gas pressure within the discharge line 42, upon that closed thread reaching the point where it is exposed by way of edge 66' of the slide valve member 38 to the discharge port 40, immediately thereof gas pressure is equalized with that of discharge passage. The overcompression loss or drop in pressure and thus the wasted energy may be seen by comparing that portion of the curve from B to E and the work involved, with the area encompassing points D, E and F. Thus, the variable discharge cut-off allows ideal compression process to be achieved, and the ideal discharge point is always maintained regardless of the change in the system conditions to which the compressor is subject.

Figure 5:
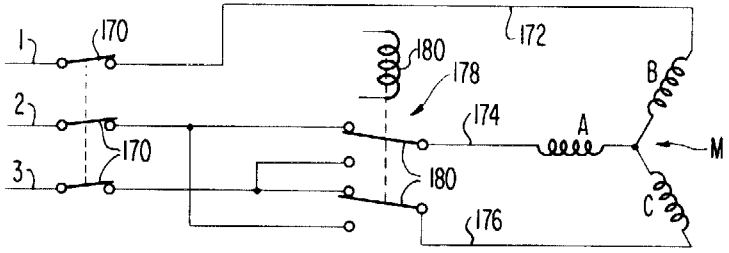
FIG. 5 is an electrical schematic of the motor reversing scheme for an electrical motor employed as the motive power to the compressor of FIG. 2.

By referring to FIG. 5, it may be seen that the motor M is provided with three windings, A, B and C, corresponding to a three phase source 1, 2, 3. Circuit breakers 170 permit the motor leads 172, 174, 176 to be cut off from the line. Any two of the leads may be reversed, and a solenoid operated switch 178 includes a coil 180, which when energized switches lines 174 and 176 relative to the phases 2 and 3 of the source such that winding A is connected to phase 3 and winding C is connected by way of line 176 to phase 2 through movable contacts 180. The motor should be disconnected from the three phase source prior to energization of solenoid 178 and switching of the contacts 180.

Figure 4:
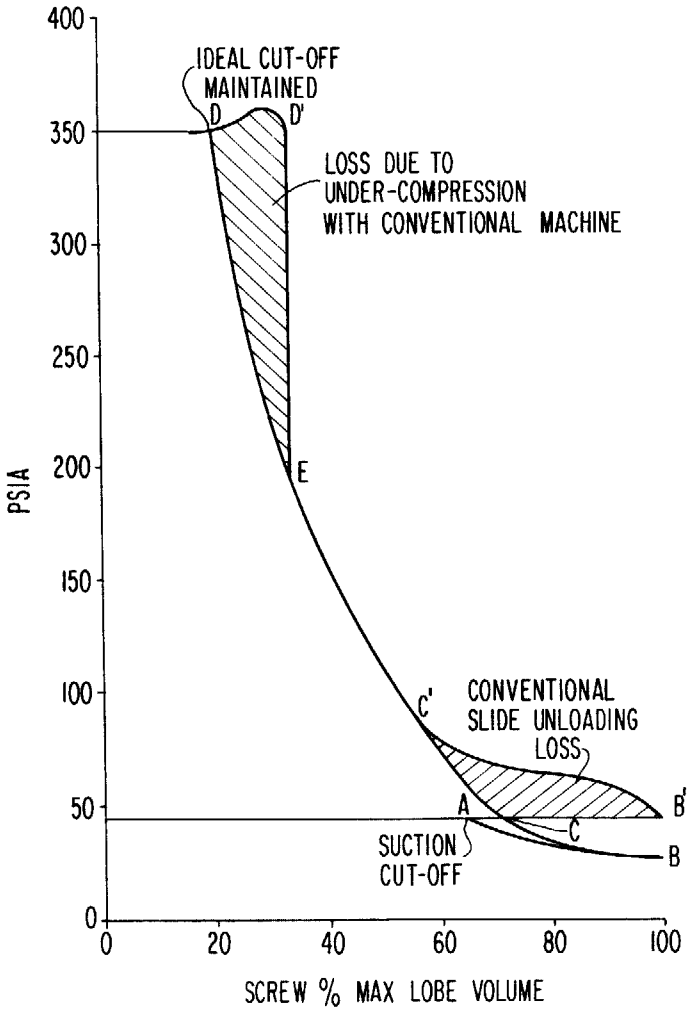
FIG. 4 is a pressure plot of the helical screw compressor of FIG. 2 for a heat pump system operating during the heating cycle, in comparison with a similar conventional screw compressor with a single, conventional slide valve for capacity control.

This permits the compressor 10' to be driven in either of two directions which makes the compressor particularly applicable to heat pump operation or permits the compressor to be driven in a reverse manner to supply hot refrigerant to the condenser coil for cyclic defrosting without the necessity of employing reversing valves or the like which are conventional to such systems. Further, with reference to the compressor 10' being employed in a heat pump application, during the heating cycle, the pressure curve illustrated in FIG. 4 shows by way of a pressure volume plot, the manner in which the compressor 10' employing the multiple slide valve members of the present invention eliminates the loss due to conventional slide valve unload through the isentropic expansion and recompression. In this case passage 34 acts as the discharge passage and passage 42 acts as the suction passage. In addition to the conventional side unloading loss which is eliminated by the arrangement of the present invention and which is graphically illustrated by the area as defined by points A, B', C', the energy loss due to undercompresson with the conventional machine comprises the area defined by points E, D, D'. Thus, without being able to sense the pressure within the closed thread, undercompression occurs, and when that closed thread opens up to the discharge side of the machine, the closed thread pressure is immediately raised to discharge port pressure thus absorbing excess energy to discharge the compressed gas and the gas which backflowed into the closed thread volume.

While not shown, particularly where the compressor is employed in a heat pump system, the compressor and drive motor may be hermetic with the gas passing directly over the motor windings. In this case, the motor is directly cooled by either the suction or discharge, the motor being cooled by the compressor discharge on one cycle such as the cooling cycle, and being cooled by means of the suction gas on the other cycle.

It may be seen from the description of the above that absolute minimum power consumption results regardless of operation cycle, condensing temperature, percentage of load on the compressor, etc. The compressor seeks by sensing parameters associated with the compressor itself to balance the closed thread pressure to the discharge line, in an automatic manner without the necessity of complex, external control means.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a positive displacement rotary screw compressor of the type wherein a casing is provided with a barrel portion defined by intersecting bores with coplanar axes located between axially spaced end walls and having low pressure and high pressure ports in communication with said bores at opposite ends of said barrel portion, and helical screw rotors having grooves and lands mounted for rotation within respective bores with the lands and grooves of respective rotors intermeshed, an axially extending recess is provided within the barrel portion of the casing in open communication with the bores, and a slide valve member is axially slidable in the recess with the inner face of the slide valve member being complementary to the envelope of that portion of the bores of the casing structure confronted by the opening of the recess communicating with the bore portion of the casing structure, with the valve member in sealing relation with confronting rotors, the discharge port being located within the barrel portion of the casing structure with the valve member being movable between extreme positions, in one of which, the discharge port is fully open, and the other in which, the discharge port is closed, and wherein the valve member is of sufficient length to cover the entire remaining length of the confronting portion of the rotor structure throughout the range of movement of the valve member between its extreme positions, the improvement comprising:

means for sensing the pressure of the working fluid within a closed thread closely adjacent to the end of the slide valve member closing off the discharge port to the closed thread, means for sensing the compressor discharge pressure of the working fluid at the discharge port, [and means for controlling shifting of said slide valve member axially to equalize these pressures]

*means for comparing said two pressures, and*

*means responsive to said pressure comparing means for shifting said slide valve member in a direction tending to equalize said pressures,* to prevent undercompression or overcompression of the compressor working fluid within the closed thread, prior to discharge.

2. The screw compressor as claimed in claim 1, wherein: said slide valve member carries a port opening to the closed thread, motor means shifts said slide valve member axially, and wherein said comparing means is operatively coupled to said motor means, said comparing means and said motor means lie external of the compressor casing, and said compressor further comprises fluid passage means leading from said sensing port to said comparing means.

3. The screw compressor as claimed in claim 1, wherein: said motor means comprises a power piston slidable within a closed cylinder and mechanically coupled to said slide valve member, and said compressor further comprises a source of pressurized motive fluid, and a pilot valve responsive to the pressure differential between the closed thread pressure and the compressor discharge pressure at the compressor discharge port for controlling the flow of motive fluid to and from respective sides of the power piston to shift slide valve member to balance the said pressures.

4. The screw compressor as claimed in claim 3, wherein: said pilot valve comprises a valve spool shiftable between two extreme positions and said comparing means comprises means for directly applying the gas pressure of the closed thread and the gas pressure within the compressor discharge line at the discharge port, in opposition to each other, to said valve spool to shift said valve spool in a direction such that the applied motive fluid to the power piston shifts the slide valve member so as to balance said gas pressures.

5. A positive displacement reversible screw compressor of a type wherein a casing is provided with a barrel portion defined by intersecting bores with coplanar axes located between axially spaced end walls, and having ports at opposite ends of the barrel portion communicating with said bores, helical screw rotors each having grooves and lands mounted for rotation within respective bores with the lands and grooves of respective bores rotors intermeshed, the improvement comprising:

axially extending recesses provided within the barrel portion of the casing on respective sides of a plane including the coplanar axes of the intersecting bores, said recesses being in open communication with the bores, oppositely oriented, slide valve members axially slidable within the said recesses with the inner face of each slide valve member being complementary to the envelope of that portion of the bores of the casing structure confronted by the opening of its recess communicating with the bore portion of the casing structure with the valve members in sealing relation with the confronting rotor structure, said working fluid ports being located within the barrel portion of the casting structure and the slide valve members, in each case, being movable between extreme positions in one of which the port is fully open and the other in which the port is closed, the valve members in each case being of sufficient length to cover the entire remaining length of the confronting portion of the rotor structure throughout the range of movement of said valve members between said extreme positions, means for driving the compressor in either of two directions, to change said ports from suction to discharge and vice versa, means for selectively sensing the pressure of the working fluid within a closed thread closely adjacent to the end of the slide valve which closes off the discharge port to the closed thread, depending upon the direction of rotation of the screw compressor, means for sensing the pressure of the working fluid within the discharge passage adjacent the discharge port, means for comparing those pressures and for shifting said slide valve member closing off the discharge port axially to equalize those pressures to prevent undercompression and overcompression of the working fluid, and means for axially shifting the other slide valve member associated with the suction part to control compressor capacity.

6. The screw compressor as claimed in claim 5, wherein the means for sensing the pressure of the working fluid within the closed thread adjacent the discharge port in each case comprises a sensing port carried by the slide valve member opening to the closed thread, and fluid passage means within each slide valve member in fluid communication with said sensing port and with said comparing means.

7. The screw compressor as claimed in claim 6, wherein; said means for comparing said pressures and for shifting said slide valve members axially to equalize the pressure, in each case, comprises a servo system including a pilot valve and a power piston, means operatively coupling the power piston to the slide valve member, means for directly applying, in opposition, the gas pressure at the sensing port and the gas pressure in the discharge line adjacent the discharge port to said pilot valve to control the applicaion of motive fluid from said pilot valve to the power piston for shifting said slide valve member to a position where said gas pressures are balanced.

8. The screw compressor as claimed in claim 7, further comprising: means for selectively isolating said pilot valves from said gas pressures being compared, and means for selectively applying directly to said pilot valve, fluid control signals indicative of compressor load for driving said slide valve members, whereby; depending upon the direction of compressor rotation, one of said pilot valves operates to control capacity and the other acts to balance said pressures, and vice versa.

9. The screw compressor as claimed in claim 6, wherein: said means for shifting each slide valve member comprises a cylinder coaxial with said slide valve member, a power piston carried by said cylinder, a piston rod mechanically coupling said power piston to said slide valve member, a source of pressurized motive fluid for said power piston, a pilot valve responsive to gas pressure differential for operatively supplying said pressurized motive fluid to said power piston for selective application to one side or the other of the power piston for shifting said power piston and said slide valve member connected thereto, and fluid passage means including said slide valve, said piston rod and said piston for directly communicating said closed thread pressure sensing port to said pilot valve for controlling the position of the pilot valve spool and the distribution of said pressurized motive fluid to said power piston.

10. The screw compressor as claimed in claim 9, wherein: said pilot valve comprises a cylindrical casing, a valve spool slidably positioned within said casing and shiftable between extreme positions, said valve spool including lands on opposite ends thereof, axial ports at respective ends of said casing, one of said axial ports being in fluid communication with said closed thread and the other of said axial ports being in fluid communication with the compressor discharge adjacent the discharge port; whereby, said servo valve spool directly compares the gas pressures and automatically shifts to a position to apply pressurized motive fluid to the power piston so as to shift the slide valve member to balance said gas pressures.

11. In a positive displacement rotary screw compressor of the type wherein a casing is provided with a barrel portion defined by intersecting bores with coplanar axes located between axially spaced end walls and having low pressure and high pressure ports in communication with said bores at opposite ends of said barrel [portions] *portion*, and helical screw rotors having grooves and lands mounted for rotation within respective bores with the lands and grooves of respective rotors intermeshed, a recess is provided within the casing in open communication with the bores and a slide valve member is slidable relative to said recess and the interface of the slide valve member is complementary to the recess opening of the casing and the valve member is positioned such that it functions during the sliding movement to vary the size of the opening of the discharge port, the improvement comprising:

means for sensing the pressure of the working fluid within a closed thread closely adjacent to the end of the slide valve member closing off the discharge port to the closed thread, means for sensing the compressor discharge pressure of the working fluid at the discharge port, means for controlling shifting of said slide valve member to equalize these pressures to prevent undercompression of overcompression of the compressor working fluid within the closed thread, prior to discharge [, and a port within said slide valve member opening to a closed thread closely adjacent the end of the slide valve member closing off the discharge port to the closed thread, means for sensing the compressor discharge pressure of the working fluid at the compressor discharge port, and means for controlling shifting of said slide valve member axially to equalize the pressures within said closed thread and said discharge port to prevent undercompression or overcompression of the compressor working fluid within the closed thread, prior to discharge].

*12. The rotary screw compressor as claimed in claim 11, wherein said slide valve member closing off the discharge port carries a port opening to said closed thread and said means for controlling shifting of said slide valve further comprises means for comparing the closed thread pressure at said slide valve member port with the compressor discharge pressure at the discharge port.*

*13. In a positive displacement rotary screw machine of the type wherein a casing is provided with a barrel portion defined by intersecting bores with coplanar axes located between axially spaced end walls and having low pressure and high pressure ports in communication with said bores at opposite ends of said barrel portion, and helical screw rotors having grooves and lands mounted for rotation within respective bores with the lands and grooves of respective rotors intermeshed, a recess is provided within the casing in open communication with the bores and a slide valve member is slidable relative to said recess and the interface of the slide valve member is complementary to the recess opening of the casing and the valve member is positioned such that it functions during the sliding movement to vary the size of the opening of one of said ports, the improvement comprising:*

*means for sensing the pressure of the working fluid within a closed thread closely adjacent to the end of the slide valve member closing off said one port to the closed thread,*

*means for sensing the pressure of the working fluid at said one port,*

*means for comparing said two pressures, and*

*means responsive to said pressure comparing means for shifting said slide valve member in a direction tending to equalize said pressures.*

*14. The rotary screw machine as claimed in claim 13, wherein said means for sensing the pressure of the working fluid within the closed thread closely adjacent to said one port comprises a closed thread pressure sensing port within said slide valve member opening to said closed thread closely adjacent the end of the slide valve member closing off said one port to said closed thread.*

*15. In a positive displacement rotary screw machine of the type wherein a casing is provided with a barrel portion defined by intersecting bores, with coplanar axes located between axially spaced end walls and having low pressure and high pressure ports in communication with said bores at opposite ends of said barrel portions, and helical screw rotors having grooves and lands mounted for rotation within respective bores with the lands and grooves of respective rotors intermeshed, an axially extending recess is provided within the barrel portion of the casing in open communication with the bores, and a slide valve member is axially slidable in the recess with the interface of the slide valve member being complementary to the envelope of that portion of the bores of the casing structure confronted by the opening of the recess communicating with the bore portion of the casing structure, with the valve member in sealing relation with confronting rotors, one of said ports being located within the barrel portion of the casing structure with the valve member being movable between extreme positions, in one of which said one port is fully open and the other in which said one port is closed and wherein the valve member is of sufficient length to cover the entire remaining length of the confronting portion of the rotor structure throughout the range of movement of the valve member between its extreme positions, the improvement comprising:*

*means for sensing the pressure of the working fluid within a closed thread closely adjacent to the end of the slide valve member closing off said one port to said closed thread,*

*means for sensing the pressure of the working fluid at said one port,*

*means for comparing said two pressures, and*

*means responsive to said pressure comparing means for shifting said slide valve member in a direction tending to equalize said pressures.*

*16. The rotary screw machine as claimed in claim 15, wherein said slide valve member carries a closed thread pressure sensing port opening to the closed thread, motor means shifts said slide valve member axially, and wherein said pressure comparing means is operatively coupled to said motor means, said pressure comparing means and said motor means lie external of the rotary screw machine casing, and fluid passage means leads from said sensing port to said pressure comparing means.*

* * * * *